United States Patent
Hudson

[11] 3,912,364
[45] Oct. 14, 1975

[54] MIXER FOR OPTICAL WAVEGUIDE BUNDLE

[75] Inventor: Marshall C. Hudson, Corning, N.Y.

[73] Assignee: Corning Glass Works, Corning, N.Y.

[22] Filed: Apr. 8, 1974

[21] Appl. No.: 458,530

[52] U.S. Cl. .............................. 350/96 C; 350/96 B
[51] Int. Cl.² .......................................... G02B 5/16
[58] Field of Search ........................ 350/96 B, 96 C

[56] References Cited
UNITED STATES PATENTS
3,508,807  4/1970  Mayer .............................. 350/96 C

*Primary Examiner*—David H. Rubin
*Attorney, Agent, or Firm*—William J. Simmons, Jr.; Walter S. Zebrowski; Clarence R. Patty, Jr.

[57] ABSTRACT

An optical mixer for use with first and second optical waveguide bundles. The end portions of the fibers of the first and second bundles are disposed in a parallel relationship and the ends of the fibers of each bundle are disposed in a plane that is substantially perpendicular to the axes of the fiber end portions, thereby forming first and second bundle endfaces, respectively. The two bundles are axially aligned and are disposed on opposite sides of a lens, the centers of the first and second bundle endfaces being located at the focal points thereof. Light emanating from any point on either of the bundle endfaces is refracted by the lens and substantially uniformly illuminates the endface of the other bundle.

6 Claims, 2 Drawing Figures

MIXER FOR OPTICAL WAVEGUIDE BUNDLE

BACKGROUND OF THE INVENTION

The continually increasing amount of traffic that communication systems are required to handle has hastened the development of high capacity systems. Even with the increased capacity made available by systems operating between $10^9$ hz and $10^{12}$ Hz, traffic growth is so rapid that saturation of such systems is anticipated in the very near further. High capacity communication systems operating around $10^{15}$ Hz are needed to accommodate future increases in traffic. These systems are referred 61 to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

Optical waveguides, which are a promising transmission medium for optical communication systems normally consist of an optical fiber having a core of transparent material having a refractive index $n_1$ surrounded by a layer of transparent cladding material having a refractive index $n_2$ that is lower than $n_1$. A low loss optical waveguide of this type is disclosed in U.S. Pat. No. 3,659,915 issued to R. D. Maurer et al. on May 2, 1972. Other optical waveguide structures include multiclad fibers and fibers having a gradient refractive index.

When optical waveguides are utilized to transmit optical signals between stations, they are often grouped into bundles to provide greater light carrying capacity and to provide redundancy in the event that some of the fibers break. In optical communication systems of this type, it is often necessary to couple the energy propagating in one or more bundles to one or more other bundles having a plurality of fibers that may or may not equal the number of fibers in the first group of one or more bundles. For example, a plurality of transmitters may be connected by small diameter bundles of optical waveguide fibers to a single large diameter bundle which propagates to a remote station the optical signals from all of the transmitters. Various types of multiplexing could be used to enable the recovery of the separate signals at the receiver. Each of the smaller diameter bundles can be coupled to the large diameter bundle by an optical mixer which distributes the optical signal propagating in any waveguide fiber of a smaller diameter bundle to all of the fibers of the larger diameter bundle. Such optical mixers are also employed in systems wherein a light detector and a light emitter are both coupled to the same waveguide bundle. A mixer is employed to couple the main bundle to two smaller bundles one of which is connected to the detector, the other to the emitter.

A commonly used optical mixer comprises a transparent cylinder having opposed endfaces. The end of a bundle of optical waveguides is connected to each end of the cylinder in such a manner that the bundle endfaces are disposed adjacent to opposite endfaces of the cylinder. Light emitted by any fiber in one bundle propagates through the cylinder by direct propagation or by the process of total internal reflection from the cylindrical walls thereof, thereby illuminating all of the waveguides in the second bundle. Although this mixer functions to distribute the light propagating in any fiber of the first bundle to all fibers of the second bundle, the coupling is not sufficiently uniform.

SUMMARY OF THE INVENTION

It is therefore an object of the present invention to provide a low loss optical mixer for uniformly coupling an optical signal propagating in any one of a plurality of optical waveguides of a first bundle to all of the optical waveguides of a second bundle.

Briefly, the present invention relates to an optical mixer for use in an optical communication system having first and second pluralities of optical waveguides. The mixer of the present invention comprises first and second support means for disposing the end portions of the first and second pluralities of optical waveguides into first and second bundles, respectively, wherein the axes of the end portions are maintained linear and parallel to one another. The endfaces of the fiber end portions of the first and second bundles lie in planes which are substantially perpendicular to the axes of the fiber end portions, thereby constituting first and second bundle endfaces, respectively. The second bundle endface is spaced from and faces the first bundle endface. Refractive means are disposed between the first and second bundle endfaces for refracting light radiating from all of the optical waveguide endfaces in such a manner that light radiating from any optical waveguide endface in either of the first or second bundles is directed by the refracting means to all of the opticl waveguide endfaces of the opposite bundle.

DESCRIPTION OF THE PREFERRED EMBODIMENT

Figure 1:
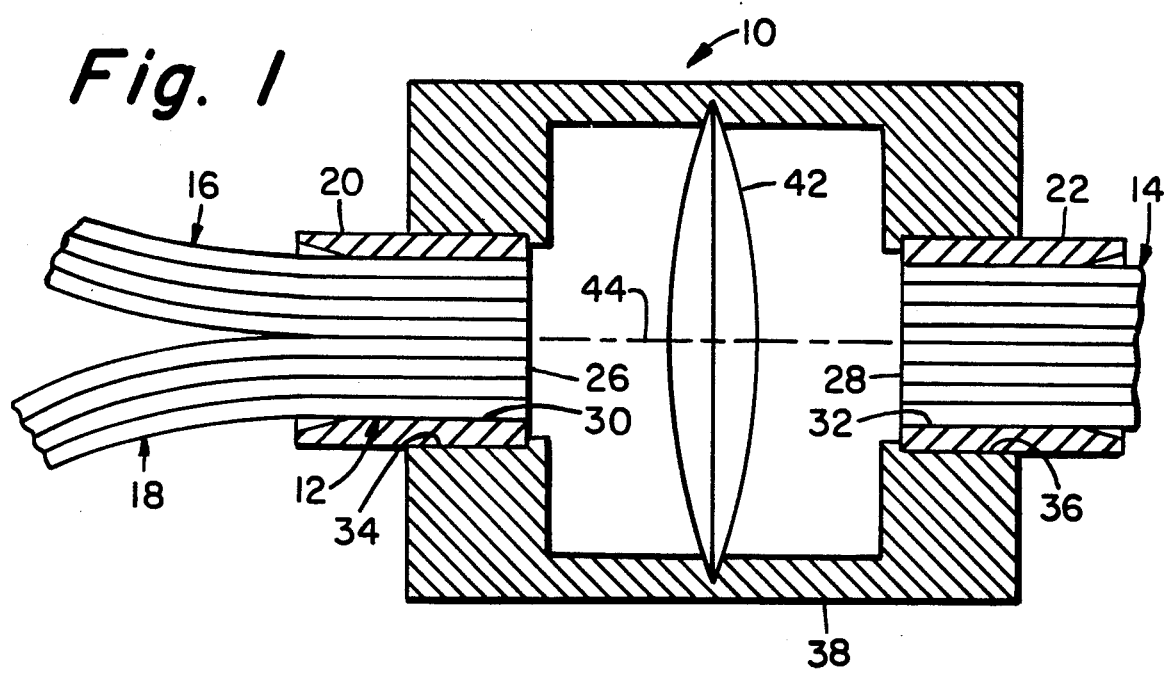
FIG. 1 is a cross-sectional view of an optical mixer constructed in accordance with the present invention.

FIG. 1 is a cross-sectional view of a passive optical mixer 10, the function of which is to couple an optical signal propagating in an optical waveguide disposed in either bundle 12 or 14 with all of the optical waveguides disposed in the opposite bundle. Either of these two bundles could be subdivided into smaller bundles. Bundle 12 is illustrated as consisting of two smaller bundles 16 and 18 which may, for example, be connected to a light emitter and a light detector, respectively, which are not illustrated in the drawing. Coupler 10 includes support means such as ferrules 20 and 22 for maintaining the end portions of the two groups of fibers connected thereto in bundles of linear, parallel fiber end portions. Bundle endfaces 26 and 28 are substantially perpendicular to the axes of these end portions. To achieve maximum coupling of light between bundles 12 and 14, the axes of the fiber end portions of bundle 12 should be substantially parallel to those of bundle 14. Ferrules 20 and 22 may consist of cylindrical members having apertures 30 and 32, respectively, which are tapered at one end to facilitate insertion of the optical waveguides. The ferrule apertures may have any suitable cross-sectional configuration such as circular, hexagonal, or the like. After the waveguides are inserted into the ferrules, they may be secured in place by a suitable bonding material such as epoxy, or the bundles may be retained in the ferrules by crimping or clamping means known in the connector art. The optical waveguides may initially extend through the apertures and beyond the ends of the ferrules. The protruding ends of the waveguides are then cut off, and the ends of the ferrules along with the corresponding ends of the optical waveguides are ground down with grinding paper to form optical quality bundle endfaces 26 and 28. It is therefore preferred that ferrules 20 and 22 be made of a material such as glass, brass or the like which has grinding characteristics similar to those of the optical waveguide material. The bundle endfaces 26 and 28 preferably lie in planes which are substantially perpendicular to the longitudinal axes of apertures 30 and 32, respectively.

Ferrules 20 and 22 are mounted in apertures 34 and 36, respectively, which are disposed at opposite ends of housing 38. Lens 42 is disposed within housing 38 in such a manner that the optical axis thereof, which is represented by broken line 44, passes through the centers of endfaces 26 and 28. Those skilled in the art will appreciate the fact that lens 42 may be employed alone or it may be replaced by a system having a plurality of lenses.

Figure 2:
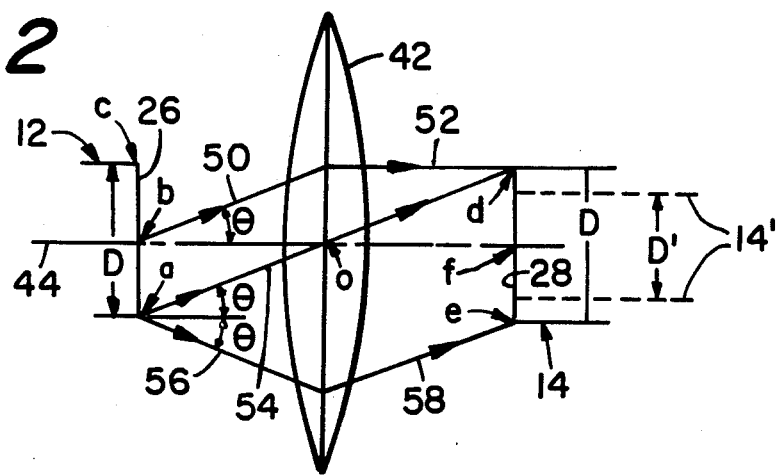
FIG. 2 is a diagram that is useful for calculating the dimensions of the optical mixer of FIG. 1.

Proper mixer operation requires that a portion of the optical signal propagating in any one of the optical waveguides disposed in bundles 12 and 14 must be coupled to all of the optical waveguides of the other bundle. Reference is made to FIG. 2 which shows a diagram that is useful in calculating the dimensions of mixer 10 that are required to achieve such operation. The distance D is the greatest distance across the larger of optical waveguide bundles 12 and 14; e.g. it is equal to the diameter of a circular bundle or the distance between two opposing apices of a bundle having a hexagonal cross section. In the embodiment illustrated, bundles 12 and 14 are taken to be circular bundles, each having a diameter D. Points $a$ and $c$ are opposed, peripherally disposed points on endface 26, and point $b$ is the midpoint of line $ac$. Points $d$ and $e$ are opposed, peripherally disposed points on endface 28, and point $f$ is the midpoint of line $de$. Broken line 44, which represents the longitudinal axes of bundles 12 and 14 passes through point $o$, the center of lens 42, the focal points of which are located at points $b$ and $f$. The angle $\theta$ is the meridional acceptance angle of the optical waveguides in bundles 12 and 14 in the medium disposed between endfaces 26 and 28 and lens 42, this medium being ambient atmosphere in the illustrated embodiment. The angle $\theta$ is determined by the equation $\theta = \sin^{-1}(1/n_0)\sqrt{n_1^2 - n_2^2}$, where $n_1$ and $n_2$ are the refractive indices of the optical waveguide core and cladding, respectively, and $n_0$ is the refractive index of the medium disposed between endfaces 26 and 28 and lens 42. The characteristics of lens 42 and the positioning of endfaces 26 and 28 with respect thereto must be such that light radiating from any given waveguide fiber of bundle 12 is refracted by lens 42 and illuminates all of the waveguide fibers in bundle 14, and light radiating from any waveguide fiber of bundle 14 is refracted by lens 42 and illuminates all of the fibers of bundle 12. This condition is satisfied if light rays emanating from an optical waveguide terminating at point $a$ impinge upon points $d$ and $e$, and if a light ray emanating from an optical waveguide terminating at point $b$ impinges upon point $d$. These rays are referred to herein as extreme rays since they radiate from an optical waveguide at the angle $\theta$ from the optical waveguide axis. Some light is radiated from the waveguide at angles greater than the angle $\theta$, but the intensity of such light decreases rapidly at angles greater than $\theta$. The aforementioned conditions will be met if endfaces 26 and 28 are centered on the focal points of lens 42, and if the focal length $f$ of that lens is determined by the equation $f = d/(2 \tan \theta)$. It can thus be seen that an extreme ray represented by line 50 radiating from a waveguide at point $b$ is refracted by lens 42 and propagates in a direction parallel to axis 44 at a distance D/2 therefrom as indicated by line 52. Ray 52 must therefore impinge upon point $d$ which is located a distance d/2 from point $f$. Since the entire system of the preferred embodiment is symmetrical about axis 44, it is obvious that some other extreme ray radiated from the waveguide at point $b$ will impinge upon point $e$. Moreover, a portion of the light radiation from the waveguide disposed at point $b$ will obviously illuminate those waveguides of bundle 14 disposed between points $d$ and $e$. If the focal distance of the lens is determined as previously indicated and if a thin lens is employed, an extreme ray represented by line 54, which radiates from a waveguide at point $a$, will pass through the center of lens 42 and impinge upon point $d$ which is located in the opposite focal plane at a distance D/2 from axis 44. Moreover, another extreme ray, represented by line 56 will be refracted by lens 42 back toward axis 44 at an angle $\theta$ with respect to that axis. This refracted ray, which is represented by line 58, therefore impinges upon point $e$. Light radiated from the waveguide at point $a$ which is directed toward lens 42 at angles smaller than $\theta$ with respect to the waveguide axis will impinge upon endface 28 between points $d$ and $e$.

If the two waveguide bundles had different diameters, the diameter of the larger bundle being D and the diameter of the smaller bundle being D', both bundle endfaces would be disposed in the focal planes of a lens having a focal length $f$ as determined hereinabove in terms of the distance D and the angle $\theta$. The smaller diameter bundle would preferably be centered on axis 44 as indicated by dashed lines 14'. However, the endface of the smaller diameter bundle could be disposed anywhere between points $d$ and $e$.

I claim:

1. In an optical communication system having first and second pluralities of optical waveguides, an optical mixer for coupling a portion of the optical signal propagating in any one of the waveguides of either said first or said second plurality of optical waveguides to all of the optical waveguides of the remaining plurality of optical waveguides, said mixer comprising first and second support means for disposing the end portions of said first and second pluralities of optical waveguides into first and second bundles, respectively, wherein the axes of said end portions of said first plurality of optical waveguides are maintained linear and parallel to one another, the axes of said end portions of said second plurality of optical waveguides are maintained linear and parallel to one another, and wherein the axes of the end portions of said first plurality of optical waveguides are substantially parallel to the axes of the end portions of said second plurality of optical waveguides, the endfaces of said fiber end portions of said first and second bundles lying in planes which are substantially perpendicular to the axes of said fiber end portions, thereby constituting first and second bundle endfaces, respectively, said second bundle endface being spaced from and facing said first bundle endface, and refractive means disposed between said first and second bundle endfaces for refracting light radiating from all of said optical waveguide endfaces in such a manner that light radiating from any optical waveguide endface in either of said first or second bundles is directed by said refracting means to all of the optical waveguide endfaces of the opposite bundle.

2. An optical communication system in accordance with claim 1 wherein said refractive means comprises a lens, and said first and second bundle endfaces lie in the focal planes of said lens.

3. An optical communication system in accordance with claim 2 wherein the focal length $f$ of said lens is determined by the equation $f = d/(2 \tan \theta)$, wherein $D$ is the greatest distance across either of said bundle endfaces and the angle $\theta$ is the acceptance angle of said optical waveguides.

4. An optical communication system in accordance with claim 3 wherein those portions of said first plurality of optical waveguides which extend beyond said first support means are divided into a plurality of bundles.

5. An optical communication system in accordance with claim 3 wherein the greatest distance across said second bundle is smaller than the greatest distance D across said larger bundle, and the projection of said second bundle endface along the axis of said lens toward said first bundle falls within said first bundle endface.

6. An optical communication system in accordance with claim 5 wherein said first and second bundle endfaces are centered on the axis of said lens.

* * * * *